United States Patent [19]

Sakowski

[11] 4,175,038

[45] Nov. 20, 1979

[54] PURIFICATION OF WASTE STREAMS CONTAINING AVAILABLE CHLORINE

[75] Inventor: Walter J. Sakowski, Cleveland, Tenn.

[73] Assignee: Olin Corporation, New Haven, Conn.

[21] Appl. No.: 926,771

[22] Filed: Jul. 21, 1978

[51] Int. Cl.$^2$ ............................................. C02B 1/36
[52] U.S. Cl. .................................................. 210/62
[58] Field of Search .................. 210/62, 59, 63 R, 64, 210/50

[56] References Cited

U.S. PATENT DOCUMENTS

| | | | |
|---|---|---|---|
| 1,197,640 | 9/1916 | Kriegsheim | 210/62 X |
| 1,609,759 | 12/1926 | McMahon | 210/62 X |
| 2,452,970 | 11/1948 | Vincent et al. | 210/62 |

OTHER PUBLICATIONS

Jacobson, *Encyclopedia of Chemical Reactions*, vol. 2 (1948), p. 138.

White, *Handbook of Chlorination*, Van Nostrand Reinhold Co., New York (1972), pp. 377–382.

*Primary Examiner*—Thomas G. Wyse
*Attorney, Agent, or Firm*—Donald F. Clements; James B. Haglind

[57] ABSTRACT

A process is disclosed for reducing the available chlorine content of aqueous waste streams produced in chemical plants, especially calcium hypochlorite plants, in order to permit further purification treatment in waste purification systems which employ activated carbon. The available chlorine content is reduced by chlorinating the impure stream at a temperature in the range from about 80° to 100° C. at a pH in the range from about 5.5 to about 8.5. In order to avoid excessive reactor boilover, close control of these conditions is required. In addition the reaction is time dependent and the holdup time in the reactor and a subsequent hold tank ranges from about 0.5 to about 4 hours. During this reaction the available chlorine forms the corresponding chlorate in the aqueous solution which may be passed through the activated carbon bed without adversely affecting the bed operation.

8 Claims, No Drawings

PURIFICATION OF WASTE STREAMS CONTAINING AVAILABLE CHLORINE

This invention is a process for purifying aqueous waste streams containing available chlorine in concentrations in the range that adversely affects the operation of activated carbon beds employed in the purification of the waste stream.

In recent times a strong effort has been made by industry and government to purify waste streams produced in processing plants for chemical products. Frequently municipal sewage purification operations are designed to handle a complex waste disposal stream formed from a variety of waste streams generated in a multiplicity of chemical plants producing a wide variety of chemical products. One component of the municipal sewer disposal plant is an activated carbon bed which is employed primarily to remove organic waste components from liquid waste streams prior to conveying the purified water into fresh water systems such as rivers, lakes, and the like.

Although it is extremely difficult to design a simple system to handle a composite waste stream from a multiplicity of chemical plants producing a variety of chemical products, such a system has been developed in a number of chemical complex areas. One component that adversely affects the operation of the activated carbon bed is a waste stream from chemical plants which contain a relatively high concentration of available chlorine, such as waste streams produced in calcium hypochlorite plants. Because of the complexity of the chemical nature of calcium hypochlorite, it is extremely difficult to economically remove all of the calcium hypochlorite and all of the available chlorine from the waste streams prior to discharge into the municipal sewer system.

There is a need at the present time for an improved economical process for purifying waste streams containing high concentrations of available chlorine of the type produced in calcium hypochlorite plants.

It is a primary object of this invention to provide a process for reducing the available chlorine content of waste streams.

Another object of the invention is to provide a process for economically reducing the available chlorine content of waste streams formed in chemical plants which produce calcium hypochlorite.

Still another object of the invention is to provide a process for modifying waste streams formed in plants used in the production of calcium hypochlorite in order to permit contact between these purification streams and activated carbon beds employed in water purification systems.

These and other objects of the invention will be apparent from the following detailed description thereof.

It has now been discovered that the foregoing objects are accomplished in a process for reducing the available chlorine content of impure aqueous solutions which comprises chlorinating said impure aqueous solution at a temperature in the range from about 80° to 100° C. and at a pH in the range from about 5.5 to about 8.5. The chlorinated impure aqueous solution is then held for a period of time ranging from about 0.5 to about 4 hours, whereby a major portion of the available chlorine is formed into the corresponding chlorate, and the resulting purified aqueous stream is then discharged into a suitable sewer disposal unit, such as a municipal sewage treating plant.

Many impure aqueous solutions containing available chlorine in a concentration that may adversely affect the operation of activated carbon beds employed in sewage disposal plants may be treated in accordance with the process of this invention. A typical waste stream is one that is produced as a plant effluent in chemical plants used a preparation of calcium hypochlorite ($CaOCl)_2$. The process of this invention will be described as it is applied to the purification of such effluent. However, those skilled in the art will recognize that the same treatment may be applied to other available chlorine waste streams of the type produced in alkali metal hypochlorite plants such as sodium hypochlorite plants, and other alkaline earth metal hypochlorites and the like.

As indicated in *Encyclopedia of Chemical Technology*, by Kirk-Othmer, 2nd edition, Volume 5, pp. 16–25, a variety of chemical processes are employed for preparing calcium hypochlorite. Each plant effluent from these processes will have a different detailed analysis, depending upon the reaction used in the preparation of calcium hypochlorite and the efficiency of the process and the plant operation. However, each will have an excess of available chlorine in the form of calcium hypochlorite. A typical analysis of such an effluent from a typical calcium hypochlorite plant which is discharged into the municipal sewer system is illustrated as follows.

| Component | Typical Analysis | Max./Min. Analysis |
|---|---|---|
| $Ca(OCl)_2$ | 18 grams per liter | 4 to 80 gpl |
| NaCl | 60 " | 25 to 200 gpl |
| $Ca(OH)_2$ | 2 " | <1 to 10 gpl |
| $Ca(ClO_3)_2$ | 3 " | 1 to 15 gpl |
| $CaCl_2$ | 35 " | <1 to 200 gpl |

In order to reduce the amount of calcium hypochlorite lost into the sewer, it is essential that there be close control of reaction conditions in the plant used in the preparation of calcium hypochlorite. Because of the solubility characteristics of calcium hypochlorite and occasional spills during processing, it is extremely difficult to economically remove all the calcium hypochlorite from the waste stream effluent, and as a result, the chemical analyses of the waste effluent will vary as indicated above.

The waste effluent is collected in a suitable sump and conveyed to a suitable reactor, which is preferably constructed of a corrosion-resistant material such as titanium. The reactor is provided with a suitable sparger and preferably an agitator which permits feeding gaseous chlorine with agitation to the waste effluent in the reactor. Although liquid chlorine may be employed as the chlorinating agent, it is preferred to employ gaseous chlorine in order to achieve the close pH control that is required in this process. Chlorination may be carried out on a batch or continuous basis, but it is preferred to employ a continuous operation.

The temperature is maintained in the range from about 80° to about 100° C., and preferably in the range between about 90° to about 95° C. during the chlorination step as well as the subsequently defined hold step. Temperature control can be obtained by suitable external or internal heating means operating on the chlorinator reactor. However, it is preferred to employ a suitable steam sparger in the reactor and in the holding tank to maintain a temperature within the desired range. If the reactor temperature is maintained below about 80° C. the reaction rate of the auto-oxidation reaction decreases, and eventually excessive decomposition to calcium chloride and oxygen occurs. This causes excessive foaming over from the reactor at a pH in the range from about 6.5 to 7.0.

Sufficient chlorine is added to the reactor to maintain the pH in the range from about 5.5 to about 8.5 and preferably from about 6.5 to about 7.0. Initially, the impure waste effluent has a pH which varies from about 9 to about 10.5 and sufficient chlorine is added to maintain the pH during the reaction within the above-cited ranges. During the chlorination reaction it is believed that components of the waste effluent react with chlorine as follows. First, any residual alkali is chlorinated in accordance with Equation 1.

$$2Ca(OH)_2 + 2Cl_2 \rightarrow Ca(OCl)_2 + CaCl_2 + 2H_2O \quad (1)$$

Water in the effluent is further chlorinated to produce hypochlorous acid at an equilibrium point in accordance with Equation 2.

$$H_2O + Cl_2 \rightleftharpoons HOCl + HCl \quad (2)$$

Calcium hypochlorite which was originally present in the waste effluent as well as that which was formed by initial contact of the alkali with chlorine is then decomposed with assistance from the hypochlorous acid in accordance with Equation 3.

$$Ca(OCl)_2 + 4HOCl \rightarrow Ca(ClO_3)_2 + 4HCl \quad (3)$$

Further decomposition then proceeds by the auto oxidation reaction as shown in Equation 4, which is the major reaction.

$$3Ca(OCl)_2 \rightarrow Ca(ClO_3)_2 + 2CaCl_2 \quad (4)$$

Thus it can be seen that the available chlorine present in the waste effluent as calcium hypochlorite, which adversely affects the operation of the activated carbon beds, is formed into the corresponding calcium chlorate which may be passed with the waste effluent through the activated carbon beds without any adverse affects.

Although successful operation of the process can be obtained when operating within the broad pH range of about 5.5 to about 8.5, there is an undesirable oxygen forming reaction when the process is operated outside of the preferred pH range of 6.5 to 7.0. This oxygen forming reaction is represented by Equation 5.

$$Ca(OCl)_2 \rightarrow CaCl_2 + O_2 \uparrow \quad (5)$$

When the oxygen forming reaction occurs to a significant degree, i.e., above a pH of 8.5, there is a risk of reactor boilover which not only results in an interruption of the process but also causes corrosion of equipment surrounding the reactor.

In addition when the pH is reduced below about 5.5 the waste effluent is able to dissolve the gaseous chlorine fed into the reactor and as a result there is a significant consumption of chlorine as dissolved chlorine which increases the available chlorine content rather than reduce the available chlorine content of the waste effluent.

The reactions described in Equation 1-4, especially No. 4, are time dependent and as a result it it necessary to have sufficient holdup time in the reactor or a combination of the reactor and a suitable hold tank which would provide an overall holdup time ranging from about 0.5 to about 4 hours and preferably from about 1 to 2 hours. If only a reactor is employed, the entire holdup time must be essentially provided by the reactor. However, if a hold tank is employed, the holdup period may be equally distributed between the reactor and the hold tank or otherwise distributed, for example, from about 30 to about 70% of the holdup period being carried out in the hold tank.

When the reaction is carried out under pH and temperature conditions described above and an adequate holdup period is employed, the available chlorine concentration of the waste effluent is reduced from an available chlorine concentration ranging from 10 to about 80 grams per liter to a range of from less than 1 to about 2 grams per liter in the purified waste effluent. Such a purification effect is sufficient to meet the requirements of most municipal sewage systems which employ activated carbon beds. However, if desired, additional purification can be effected by adding to the purified waste effluent a suitable chemical by employing an auxiliary purification step which comprises, for example, adding a suitable reducing agent such as sodium sulfite which reduces the remaining available chlorine to 0. This reaction is essentially a stoichiometrical reaction which is relatively inexpensive for waste streams of low available chlorine content. However, if the original impure waste effluent was treated with sodium sulfite or other reducing agent, the cost of purifying the waste effluent would be prohibitive, and excessive amounts of calcium sulfate would be precipitated in the waste stream. When used in removing the available chlorine from water treated in accordance with the process of this invention, there is essentially no precipitate formed.

The following examples are presented to define the invention more fully without any intention of being limited. All parts and percentages are by weight unless otherwise specified.

EXAMPLE 1

A sample composite waste effluent from a commercial calcium hypochlorite process was obtained and analyzed. Analysis of the sample showed the following:

| Component | Grams Per Liter |
|---|---|
| Calcium Hypochlorite | 78.3 |
| Calcium Chlorate | 10.3 |
| Sodium Chloride | 239.1 |

This sample has a pH of 10.5.

One liter of this sample were heated to a temperature ranging from about 75° to about 86° C. Upon heating the pH changed from 10.3 to 9.5. Chlorination of the heated sample was effected by bubbling gaseous chlorine into the sample with mechanical agitation for a temperature of 86° C. to a pH of 5.35. At the end of this period the sample was aerated for 110 minutes while the temperature was reduced from 86° to 80° C. The pH increased to 6.46.

At the end of the 15 minute chlorination period the available chlorine content was reduced to 2.8 grams per liter and after aeration it was reduced to 0.34 grams per liter, which corresponded to the reduction of 99.6% of the available chlorine content of the original sample. At the end of the 15 minute chlorination period 96.4% of the available chlorine was converted to calcium chlorate. At the end of the 125 minute period the calcium chlorate was 63.3 grams per liter and the sodium chloride content was 333.8 grams per liter.

EXAMPLE 2

Following the procedure of Example 1, a sample of commercial waste effluent from a commercial calcium hypochlorite plant was obtained having the following analysis.

| Component | Grams Per Liter |
|---|---|
| Calcium Hypochlorite | 80.4 |
| Calcium Chlorate | 6.8 |
| Sodium Chloride | 236.1 |

The original pH of the sample was 11.02.

After heating from 15° C. to 65° C. the pH changed to 10.16. Chlorination was carried out for 5 minutes at 82° C. at which time the pH was reduced to 5.3. Without additional heating, the chlorination sample was aerated for 155 minutes at 79° C. The pH increased to 6.47. At the end of the 5 minute chlorination period, the calcium hypochlorite content was reduced to 6.0 grams per liter, which was 92.5% removal. At the end of the 160 minute period the calcium hypochlorite content was reduced to 0.43 grams per liter, which was 99.5% of the original calcium hypochlorite. In addition the final purified solution contained 74.0 grams per liter of calcium chlorate and 323.2 grams per liter of sodium chloride.

What is desired to be Secured by Letters Patent is:

1. A process for reducing the available chlorine content of an impure aqueous solution of the type produced in a plant selected from the group consisting of an alkali metal hypochlorite plant and an alkaline earth metal hypochlorite plant which comprises chlorinating said impure aqueous solution at a temperature in the range between about 80° to about 100° C. and at a pH in the range from about 5.5 to about 8.5, whereby a major portion of said available chlorine is formed into the corresponding chlorate.

2. The process of claim 1 wherein said temperature is in the range from about 90° to about 95° C.

3. The process of claim 1 or 2 wherein the pH is in the range from about 6.5 to about 7.0.

4. The process of claim 3 wherein the holdup time is in the range from about 0.5 to about 4 hours.

5. The process of claim 4 wherein said available chlorine is present as calcium hypochlorite and the purified aqueous solution contains calcium chlorate.

6. The process of claim 5 wherein said holdup time is in the range of from about 1 to 2 hours.

7. The process of claim 6 wherein from about 30 to about 70% of the holdup time is carried out in a hold tank separated from the chlorination step.

8. The process of claim 7 wherein the aqueous solution is aerated during a substantial portion of said holding period.

* * * * *